United States Patent
Wu

(10) Patent No.: US 8,696,181 B2
(45) Date of Patent: Apr. 15, 2014

(54) VEHICULAR LAMP WITH OPTICAL AXIS ADJUSTING DEVICE

(75) Inventor: Kuo-Pin Wu, Tainan (TW)

(73) Assignee: Maxzone Auto Parts Corp., Fontana, CA (US)

( * ) Notice: Subject to any disclaimer, the term of this patent is extended or adjusted under 35 U.S.C. 154(b) by 204 days.

(21) Appl. No.: 13/332,533

(22) Filed: Dec. 21, 2011

(65) Prior Publication Data
US 2013/0114278 A1     May 9, 2013

(30) Foreign Application Priority Data
Nov. 3, 2011    (TW) .............................. 100220766 U

(51) Int. Cl.
*F21V 7/00*      (2006.01)

(52) U.S. Cl.
USPC ............ 362/514; 362/515; 362/523; 362/528

(58) Field of Classification Search
USPC .................................. 362/514, 515, 523, 528
See application file for complete search history.

(56) References Cited

U.S. PATENT DOCUMENTS

| | | | | |
|---|---|---|---|---|
| 6,394,637 B1 * | 5/2002 | Watanabe et al. | ............. | 362/523 |
| 6,502,972 B2 * | 1/2003 | Matsubara | .................... | 362/523 |

\* cited by examiner

*Primary Examiner* — Stephen F Husar
*Assistant Examiner* — James Cranson, Jr.
(74) *Attorney, Agent, or Firm* — Bacon & Thomas, PLLC

(57) ABSTRACT

A vehicular lamp with an optical axis adjusting device includes a housing, a reflector assembly pivotably mounted to the housing, a light source assembly mounted to the reflector assembly, and the optical axis adjusting device mounted to the reflector assembly. The optical axis adjusting device includes a threaded shaft and a fulcrum. The fulcrum is pivotably mounted to the reflector assembly and threaded with the threaded shaft. When the threaded shaft is rotated, the fulcrum can move along the axial direction of the threaded shaft and drive the reflector assembly to pivot with respect to the housing, so the angle of the optical axis of the vehicular lamp can be adjusted.

13 Claims, 8 Drawing Sheets

VEHICULAR LAMP WITH OPTICAL AXIS ADJUSTING DEVICE

BACKGROUND OF THE INVENTION

1. Field of the Invention

The present invention relates generally to a vehicular lamp, and more particularly, to a vehicular lamp with a optical axis adjusting device.

2. Description of the Related Art

While a car is driven, a headlight thereof is a significant lighting for providing the driver with good view. The headlight can not only provide sufficient illuminative brightness and range to enable the driver to recognize the condition of the roadway and to clearly see the pedestrians, vehicles, guideposts, or other barriers but prevent the light beam from projecting onto the eyes of the driver in the opposite direction and dazzling the driver. Thus, the existing laws and regulations definitely stipulate the light beam projected from the headlight to secure the road users' safety.

In light of the above, the headlight manufacturers and the drivers must ensure that the light beam of the headlight conforms to the existing laws and regulations. However, various kinds of vehicles may have different conditions, i.e. the respective tire pressures and the respective heights of the suspension systems are set differently, so the headlight needs to have the function of adjusting the optical axis. Therefore, the inventor of the present invention proposes a vehicular lamp with a optical axis adjusting device for compliance with a variety of vehicular and road conditions.

SUMMARY OF THE INVENTION

The primary objective of the present invention is to provide a vehicular lamp with an optical axis adjusting device which is simple in structure and convenient in operation.

The foregoing objective of the present invention is attained by the vehicular lamp composed of a housing, a reflector assembly, a light source assembly, and a optical axis adjusting device. The housing includes a mounting space formed inside and an opening running through a sidewall of an end thereof and communicating with the opening. The reflector assembly is mounted inside the mounting space and includes two sides pivotably connected with the housing to be pivotable with respect to the housing. The light source assembly includes a bulb socket and a light bulb. The light bulb is mounted to the reflector assembly through the opening and has two ends, one of which is fixed to the bulb socket and the other extends into the reflector assembly. The optical axis adjusting device includes a threaded shaft and a fulcrum. The fulcrum is mounted to the reflector assembly and threaded with the threaded shaft. When the threaded shaft is rotated, the threaded connection between the threaded shaft and the fulcrum and the pivotal connection between the reflector assembly and the housing can adjust the optical axis of the reflector assembly.

In the vehicular lamp of the present invention, the reflector assembly includes a reflector and a connection element. The reflector has a plurality of fastening portions formed at a peripheral edge thereof. The housing has a plurality of fastened portions formed at a peripheral edge thereof for fixed connection with the fastening portion of the reflector assembly.

In the vehicular lamp of the present invention, the housing includes a first arc-shaped protrusion and a stopping element formed on a left sidewall and a right sidewall of the mounting space separately. The connection element of the reflector assembly has a second arc-shaped protrusion formed at each of a left side and a right side thereof and clinging to the first arc-shaped protrusion. The connection element further has a first arm portion extending outward from each of the left and right sides thereof. Each of the first arm portions has a stopping portion for interference with the stopping element of the housing. In this way, the reflector assembly can pivot with respect to the housing.

In the vehicular lamp of the present invention, the connection element of the reflector assembly has a second arm portion extending outward from a rear lateral side thereof and having a pivot hole. The fulcrum of the optical axis adjusting device has a pivot portion formed at an end thereof and pivotably wedged into the pivot hole.

In the vehicular lamp of the present invention, the reflector of the reflector assembly has a receiving hole for receiving the light bulb. At least one concavity and at least one convexity are formed at an edge of the receiving hole and staggered in arrangement. At least one block portion protrudes radially outward from a peripheral edge of the bulb socket. The block portion passes through the concavity of the receiving hole to enable the light bulb to extend into the receiving hole and when the bulb socket is rotated for an angle to stagger the block portion and the concavity, the block portion is stopped by the convexity to put the bulb socket and the reflector together.

In the vehicular lamp of the present invention, the vehicular lamp further includes a cover having an outer opening and an inner opening. The housing further includes an insertion groove recessed along an outer peripheral edge of the opening from an end sidewall thereof. The bulb socket has a cavity formed at a peripheral edge thereof. The cover makes its outer opening be wedged into the insertion groove and makes its inner opening be wedged into the cavity of the bulb socket.

In the vehicular lamp of the present invention, the threaded shaft makes its one end opposite to the fulcrum be fixedly connected with an adjusting shaft. The housing is provided with a through hole. The adjusting shaft is pivotably positioned to the through hole.

DETAILED DESCRIPTION OF PREFERRED EMBODIMENTS

Figure 1:
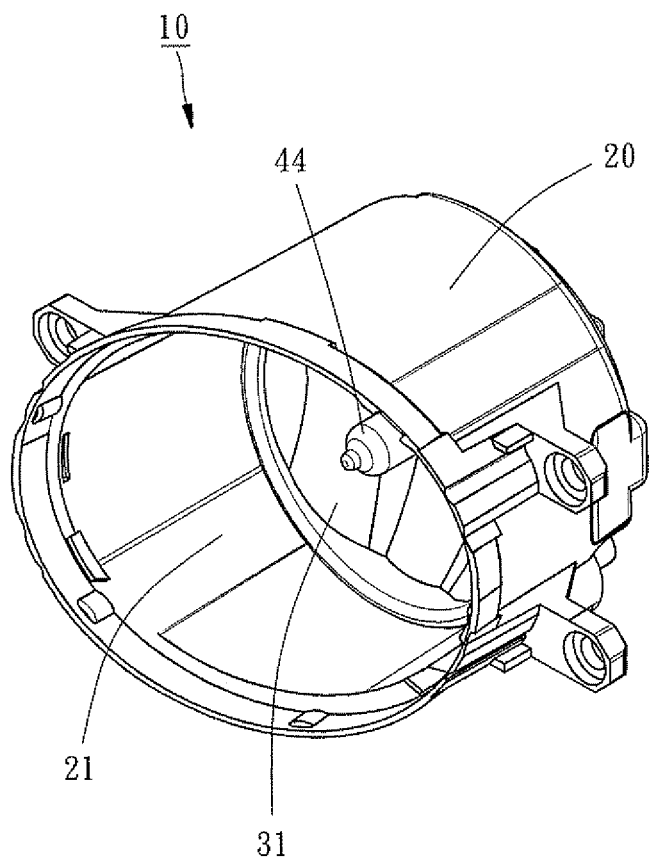
FIG. 1 is a perspective view of a preferred embodiment of the present invention.
Figure 2:
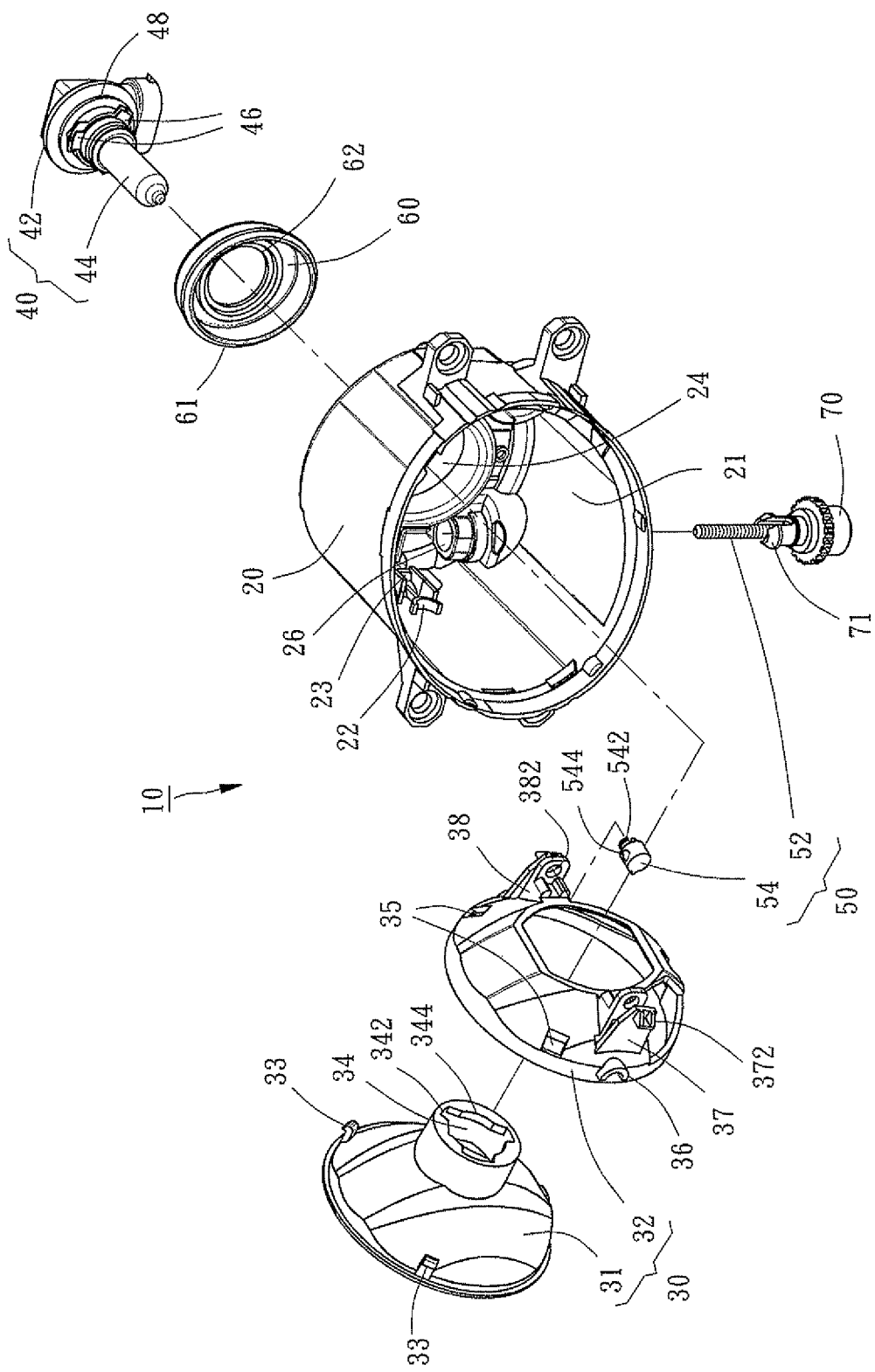
FIG. 2 is an exploded view of the preferred embodiment of the present invention.
Figure 3:
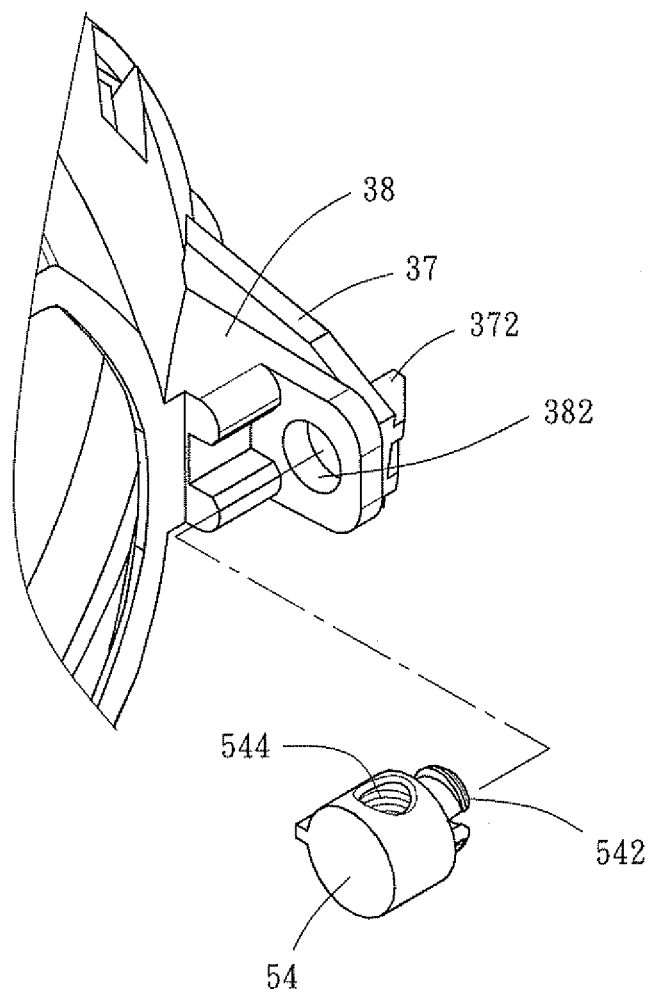
FIG. 3 is a perspective view of a part of the preferred embodiment of the present invention, illustrating the assembly of the fulcrum.

Referring to FIGS. 1-2, a vehicular lamp 10 constructed according to a preferred embodiment of the present invention is composed of a housing 20, a reflector assembly 30, a light source assembly 40, and an optical axis adjusting device 50. The detailed descriptions and operations of these elements as well as their interrelations are recited in the respective paragraphs as follows.

Figure 5:
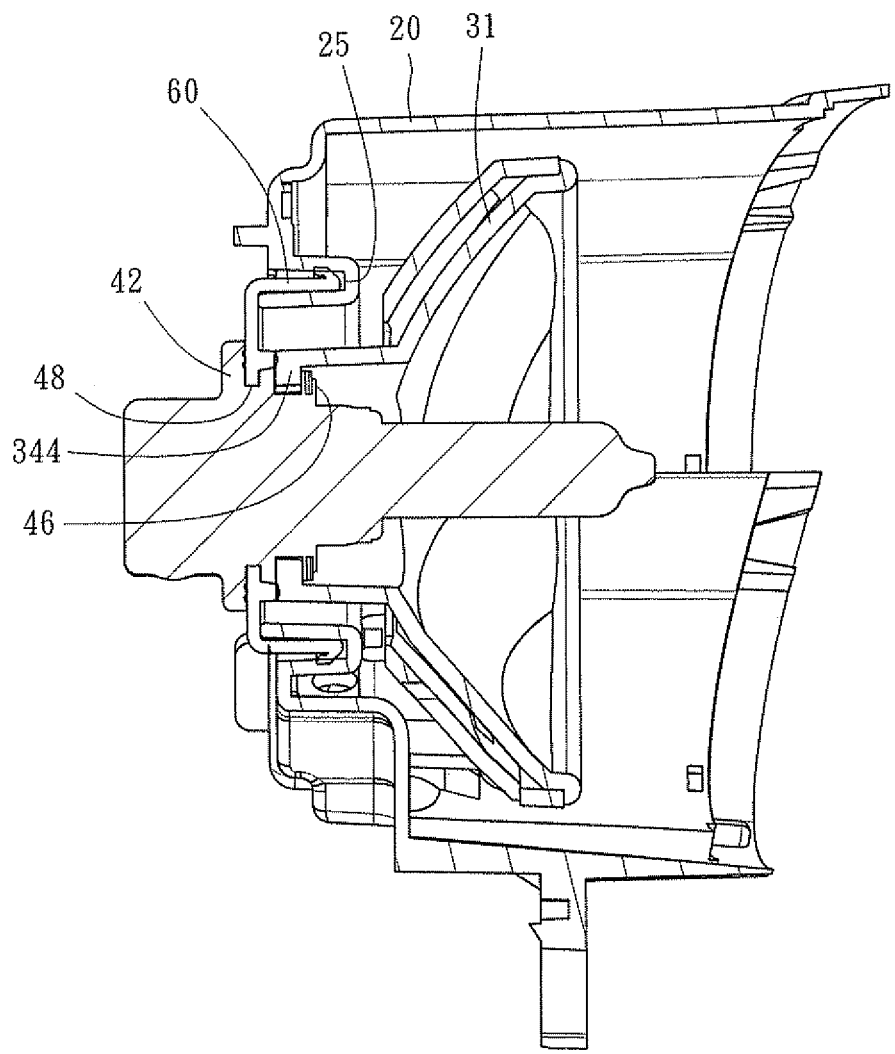
FIG. 5 is a sectional view taken along a line 5-5 indicated in FIG. 4.

The housing 20 includes an mounting space 21 formed therein and having a front opening, a first arc-shaped protrusion 22 formed on one of left and right sidewalls thereof, a stopping element 23 formed on the other sidewall thereof and located behind the arc-shaped protrusion 22, an opening 24 running through a rear end sidewall thereof and communicating with the mounting space 21, an insertion groove 25 recessed along an outer peripheral edge of the opening 24 from the rear end sidewall thereof, as shown in FIG. 5, and a through hole 26 running through a lower sidewall thereof and formed between the first arc-shaped protrusion 22 and the opening 24.

The reflector assembly 30 includes a reflector 31 and a connection element 32. The reflector 31 has three fastening portions 33 formed at a peripheral edge thereof, a receiving hole 34 formed at a center thereof, three concavities 342, and three flanges 344. The concavities and flanges 342 and 344 are formed at a periphery of the receiving receiving hole 34 and staggered in arrangement. The connection element 32 has three fastening holes 35 formed at a peripheral edge thereof for fixed connection with the fastening portions 33 in such a way that the reflector 31 and the connection element 32 can be fixedly assembled. The connection element 32 has two second arc-shaped protrusions 36, a first arm portion 37, and a second arm portion 38. Each of the second arc-shaped protrusions 36 is formed at one of the left and right sides of the connection element 32. The first arm portion 37 extends outward from one of the rear left and right sides of the connection element 32 and has a stopping portion 372. The second arm portion 38 extends outward from the other side of the connection element 32 and has a pivot hole 382 located at an inner side of the first arm portion 37.

The light source assembly 40 includes a bulb socket 42 and a light bulb 44. The bulb socket 42 has three block portions 46 and a cavity 48; the three block portions 46 protrudes radially from a peripheral edge of the bulb socket 42; the cavity 48 is annularly formed at a rear side of one of the block portions 46. As shown in FIG. 5, the light bulb 44 has one end fixed to the bulb socket 42.

The optical axis adjusting device 50 includes a threaded shaft 52 and a fulcrum 54. The fulcrum 54 has a pivot portion 542 formed at one end of the fulcrum 54. The fulcrum 54 is pivotably mounted to second arm portion 38 of the connection element 32 by the pivot portion 542 for pivotal connection between the fulcrum 54 and the reflector assembly 20. Besides, the fulcrum 54 further includes a threaded hole 544 running therethrough for threaded connection with the threaded shaft 52 in such a way that the fulcrum 54 can be driven by the threaded shaft 52 to move up and down along the axial direction of the threaded shaft 52. The threaded shaft 52 has a bottom end engaging an adjusting shaft 70. The adjusting shaft 70 includes a resilient barb 71 protruding from a top side thereof.

Figure 6:
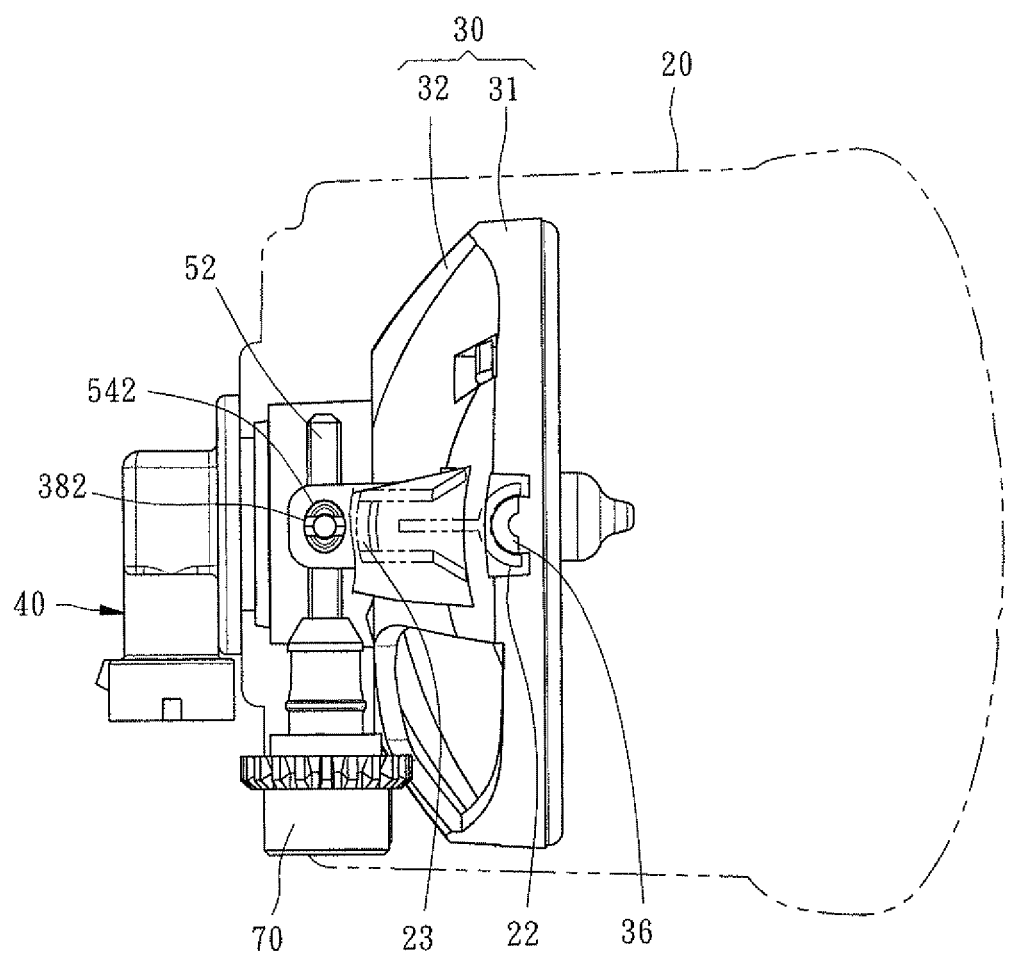
FIGS. 6-8 are partially sectional views of the preferred embodiment of the present invention in adjustment.
Figure 7:
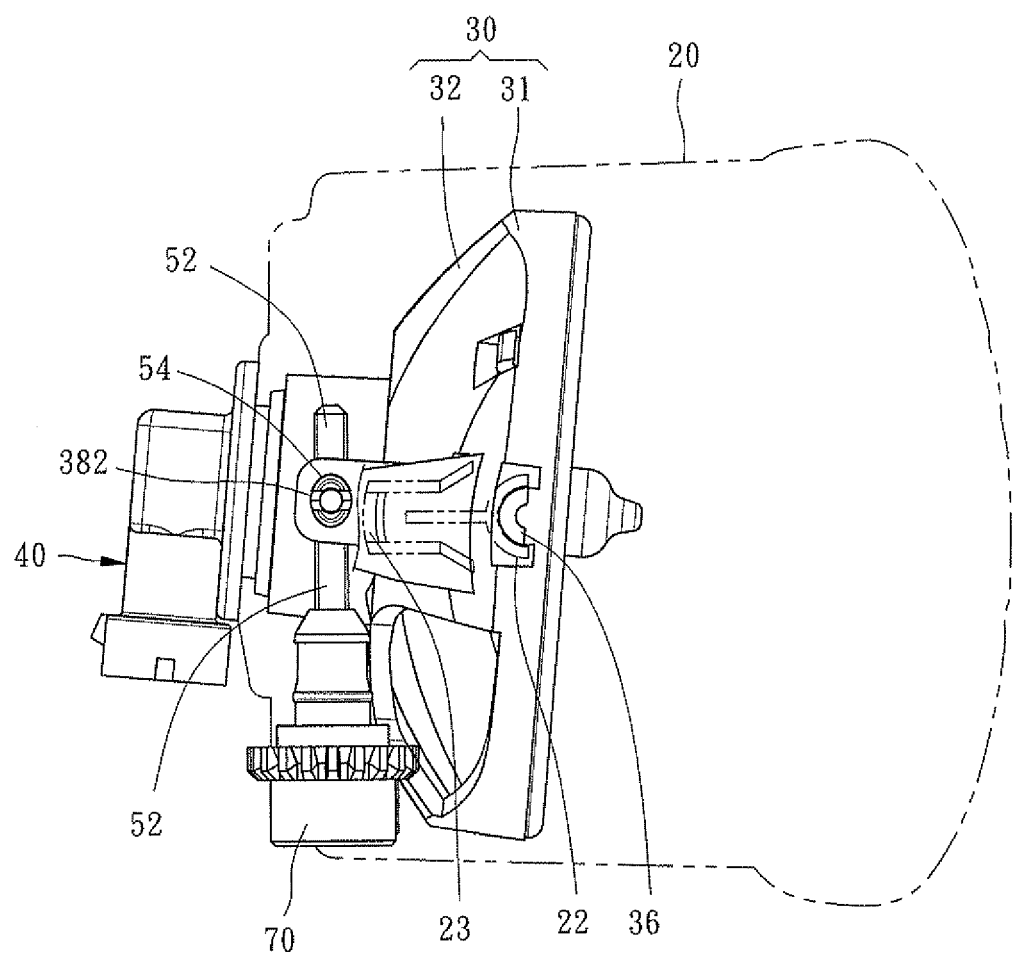
Figure 8:
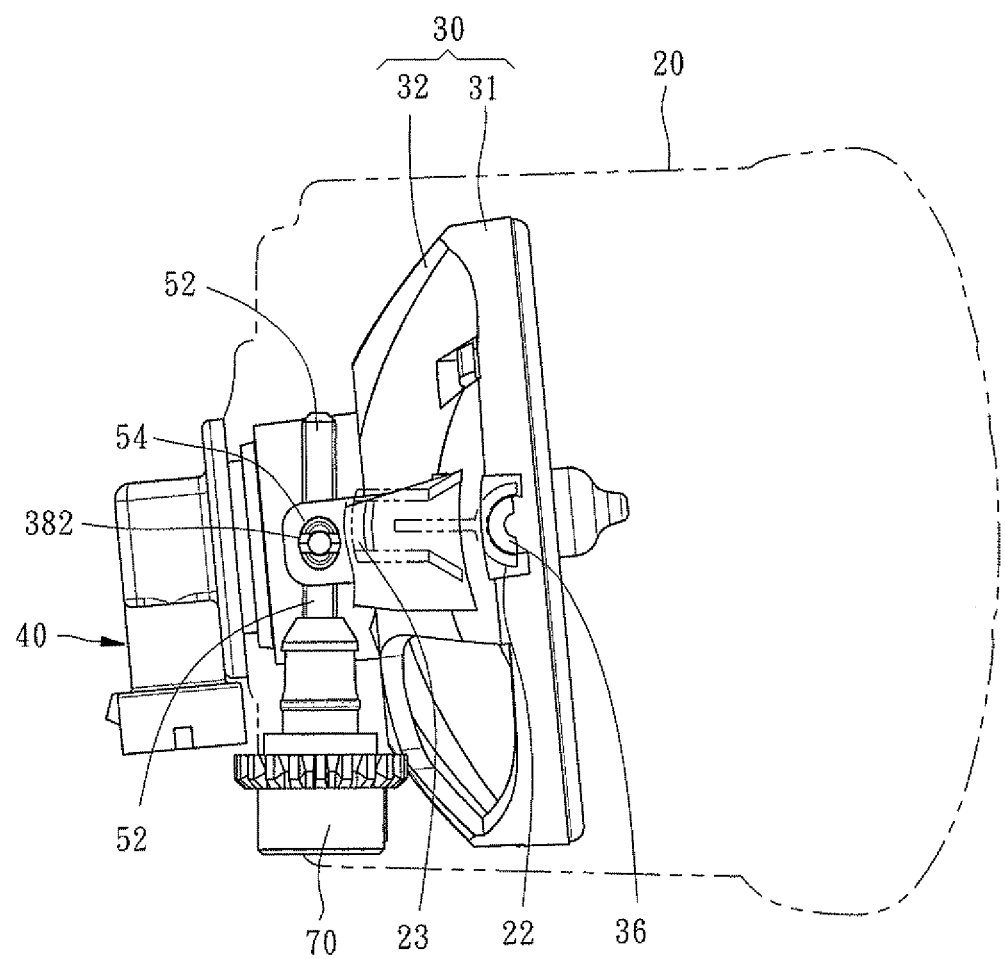

When it is intended to assemble the vehicular lamp 10, as shown in FIG. 2, wedge the pivot portion 542 into the pivot hole 382 and then put the reflector assembly 30 into the mounting space 21 through the front opening of the housing 20. When the stopping portion 372 of first arm portion 37 of the connection element 32 contacts the stopping element 23, the stopping portion 372 and the stopping element 23 can interfere with each other; meanwhile, the first arm portion 37 can resiliently deform to overcome the aforesaid interference. As soon as the stopping portion 372 passes through the stopping element 23, the first arm portion 37 restitutes to mount the reflector assembly 30 into the mounting space 21 and to make the convex arc-shaped surface of the second arc-shaped protrusion 36 cling to the concave arc-shaped surface surface of the first arc-shaped protrusion 22, as shown in FIG. 6. In this way, the reflector assembly 30 can pivot upward or downward with respect to the housing 20 through the coordination of the first and second arc-shaped protrusions 22 and 36, as shown in FIGS. 7 and 8.

Next, make the adjusting shaft 70 together with the threaded shaft 52 pass through the through hole 26 from the outside of the housing 20 via a top end of the threaded shaft 52 to enable the top end of the threaded shaft 52 to be threaded with the threaded hole 26 of the fulcrum 54. As soon as passing through the through hole 26, the resilient barb 71 of the adjusting shaft 70 is wedged into the through hole 26 to allow the adjusting shaft 70 and the threaded shaft 52 to pivot with respect to the housing 20.

At last, align the block portions 46 with the concavities 342 and enable the block portions 46 to pass through the corresponding concavities 342 to allow the light bulb 44 to extend into the receiving hole 34; then rotate the bulb socket 42 for an angle to stagger the block portions 46 and the concavities 342 in such a way that the block portions 46 can be stopped by the flanges 344, as shown in FIGS. 2 and 5, and thus the bulb socket 42 can be put together with the reflector 31 via the opening 24.

It is to be noted that each of the respective numbers of the concavities 342, flanges 344, and the block portions 46 is not limited to three and can be at least one for the purpose of the assembly.

Figure 4:
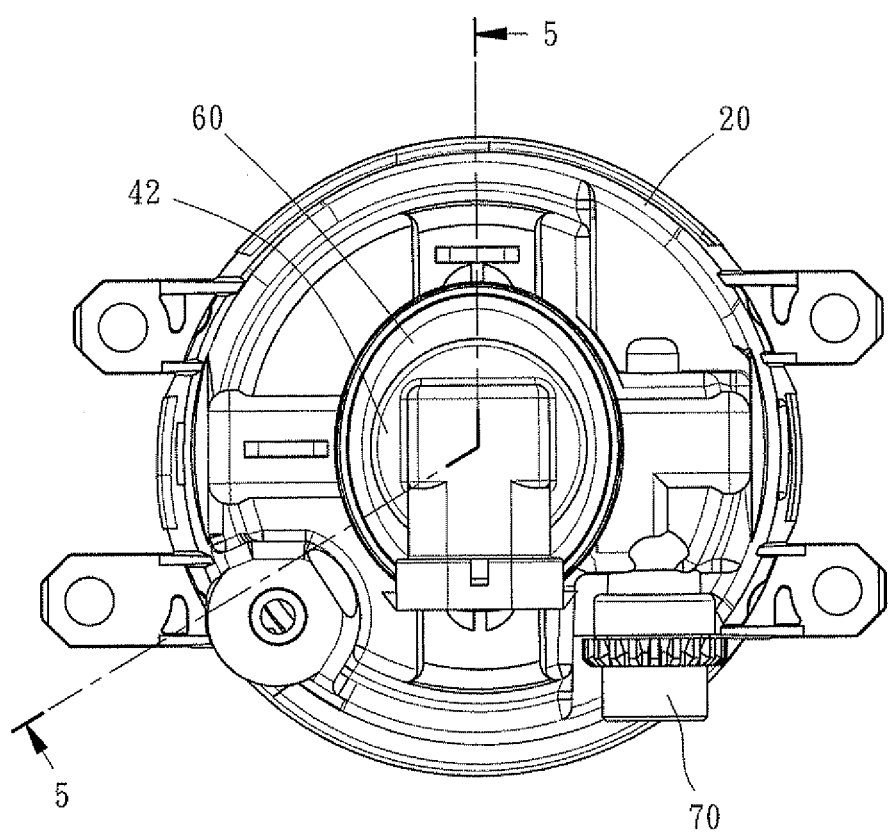
FIG. 4 is a rear view of the preferred embodiment of the present invention.

To eliminate the gap between the bulb socket 42 and the housing 20 and provide excellent water-resistant effect therebetween, the vehicular lamp 10 further includes a resilient cover 60, as shown in FIG. 2. The cover 60 has an outer opening 61 and an inner opening 62, the diameter of which is smaller than that of the outer opening 61. The peripheral edge of the outer opening 61 is wedged into the insertion groove 25 and the peripheral edge of the inner opening 62 is wedged into cavity 48, so the cover 60 can be positioned between the housing 20 and the bulb socket 32, as shown in FIGS. 4-5.

In light of the above structure, when a user intends to adjust the optical axis of the vehicular lamp 10, as shown in FIGS. 7-8, the user can rotate the adjusting shaft 70 to drive the threaded shaft 52 to rotate in situ; meanwhile, the fulcrum 54 can move upward or downward along the axial direction of the threaded shaft 52. In the process of the upward or downward movement of the fulcrum 54, the connection element 32 can be driven by the fulcrum 54 to pivot upward or downward with respect to the housing 20 via the mutual coordination of the first and second arc-shaped protrusions 22 and 36. In this way, the reflector assembly 30 and the light source assembly 40 can result in angle change for the purpose of adjusting the optical axis.

In the aforesaid preferred embodiment of the present invention, the light source assembly 40 can pivot at the same time when the reflector assembly 30 pivots, and the cover 60 can generate deformation corresponding to the pivoting movement of the light source assembly 40.

Although the present invention has been described with respect to a specific preferred embodiment thereof, it is in no way limited to the specifics of the illustrated structures but changes and modifications may be made within the scope of the appended claims.

What is claimed is:
1. A vehicular lamp, comprising:
a housing having a mounting space formed therein and an opening running through an end sidewall thereof and communicating with the mounting space;

a reflector assembly mounted inside the mounting space and having two sides pivotably connected with the housing;

a light source assembly having a bulb socket and a light bulb, the bulb socket being mounted to the reflector assembly via the opening, the light bulb having an end fixed to the bulb socket and extending into the reflector assembly; and an optical axis adjusting device having a threaded shaft and a separate fulcrum, the fulcrum being pivotably mounted to the reflector assembly and includes a threaded hole in threaded connection with the threaded shaft so that the fulcrum is driven to move along the threaded shaft connection upon rotation of the threaded shaft to drive the reflector assembly to pivot with respect to the housing for adjusting the optical axis of the lamp.

2. The vehicular lamp as defined in claim 1, wherein the reflector assembly comprises a reflector and a connection element, the connection element having a plurality of fastened portions formed at a peripheral edge thereof, the reflector having a plurality of fastening portions formed at a peripheral edge thereof for engagement with the fastened portions.

3. The vehicular lamp as defined in claim 2, wherein the housing comprises a first arc-shaped protrusion and a stopping element at a left sidewall and a right sidewall of the mounting space respectively; the connection element comprises two second arc-shaped protrusions formed at a left side thereof and a right side thereof respectively for clinging to the first arc-shaped protrusion, the connection element having two first arm portions, each of which extends outward from a rear left side thereof and a rear right side thereof and has a stopping portion contacting the stopping element for interference with each other.

4. The vehicular lamp as defined in claim 2, wherein the connection element comprises a second arm portion extending outward from a rear side thereof, the second arm portion having a pivot hole; the fulcrum comprises a pivot portion formed at an end thereof and pivotably wedged into the pivot hole.

5. The vehicular lamp as defined in claim 2, wherein the bulb socket comprises at least one block portion protruding radially from a peripheral edge thereof; the reflector comprises a receiving hole for receiving the light bulb, the receiving hole being provided with at least one concavity and at least one convexity, which are formed on a peripheral edge thereof and staggered in arrangement, the at least one concavity being adapted for the block portions to pass through, the at least one convexity being adapted for stopping the block portion for assembly and combination of the bulb socket and the reflector.

6. The vehicular lamp as defined in claim 1 further comprising a cover provided with an outer opening and an inner opening, wherein the housing comprises an insertion groove along an end sidewall thereof along an external periphery of the opening; the bulb socket comprises a cavity annularly formed on a peripheral edge thereof, a peripheral edge of the outer opening of the cover being wedged into the insertion groove; a peripheral edge of the inner opening of the cover being wedged into the cavity.

7. The vehicular lamp as defined in claim 1, wherein the threaded shaft is provided with an end opposite to the fulcrum for connection with an adjusting shaft; the housing comprises a through hole, the adjusting shaft being pivotably positioned into the through hole.

8. A vehicular lamp, comprising:
a housing having a mounting space formed therein and an opening running through an end sidewall thereof and communicating with the mounting space;

a reflector assembly mounted inside the mounting space and having two sides pivotably connected with the housing;

a light source assembly having a bulb socket and a light bulb, the bulb socket being mounted to the reflector assembly via the opening, the light bulb having an end fixed to the bulb socket and extending into the reflector assembly;

an optical axis adjusting device having a threaded shaft and a fulcrum, the fulcrum being pivotably mounted to the reflector assembly and threaded with the threaded shaft in such a way that the fulcrum can be driven by the threaded shaft to drive the reflector assembly to pivot with respect to the housing; and wherein the reflector assembly comprises a reflector and a connection element, the connection element having a plurality of fastened portions formed at a peripheral edge thereof, the reflector having a plurality of fastening portions formed at a peripheral edge thereof for engagement with the fastened portions.

9. The vehicular lamp as defined in claim 8, wherein the housing comprises a first arc-shaped protrusion and a stopping element at a left sidewall and a right sidewall of the mounting space respectively; the connection element comprises two second arc-shaped protrusions formed at a left side thereof and a right side thereof respectively for clinging to the first arc-shaped protrusion, the connection element having two first arm portions, each of which extends outward from a rear left side thereof and a rear right side thereof and has a stopping portion contacting the stopping element for interference with each other.

10. The vehicular lamp as defined in claim 8, wherein the connection element comprises a second arm portion extending outward from a rear side thereof, the second arm portion having a pivot hole; the fulcrum comprises a pivot portion formed at an end thereof and pivotably wedged into the pivot hole.

11. The vehicular lamp as defined in claim 8, wherein the bulb socket comprises at least one block portion protruding radially from a peripheral edge thereof; the reflector comprises a receiving hole for receiving the light bulb, the receiving hole being provided with at least one concavity and at least one convexity, which are formed on a peripheral edge thereof and staggered in arrangement, the at least one concavity being adapted for the block portions to pass through, the at least one convexity being adapted for stopping the block portion for assembly and combination of the bulb socket and the reflector.

12. The vehicular lamp as defined in claim 8 further comprising a cover provided with an outer opening and an inner opening, wherein the housing comprises an insertion groove along an end sidewall thereof along an external periphery of the opening; the bulb socket comprises a cavity annularly formed on a peripheral edge thereof, a peripheral edge of the outer opening of the cover being wedged into the insertion groove; a peripheral edge of the inner opening of the cover being wedged into the cavity.

13. The vehicular lamp as defined in claim 8, wherein the threaded shaft is provided with an end opposite to the fulcrum for connection with an adjusting shaft; the housing comprises a through hole, the adjusting shaft being pivotably positioned into the through hole.

* * * * *